United States Patent Office 3,065,578
Patented Nov. 27, 1962

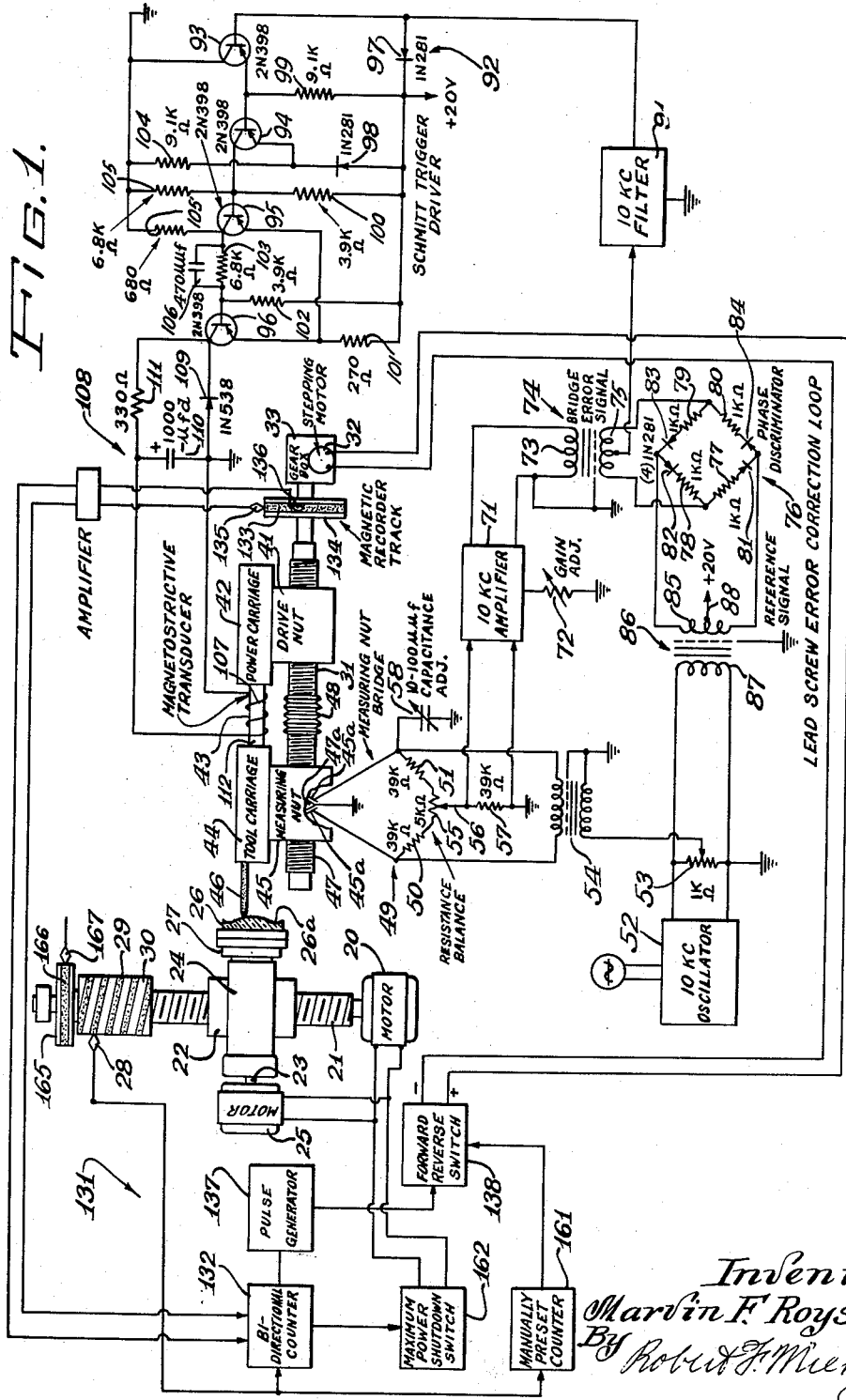

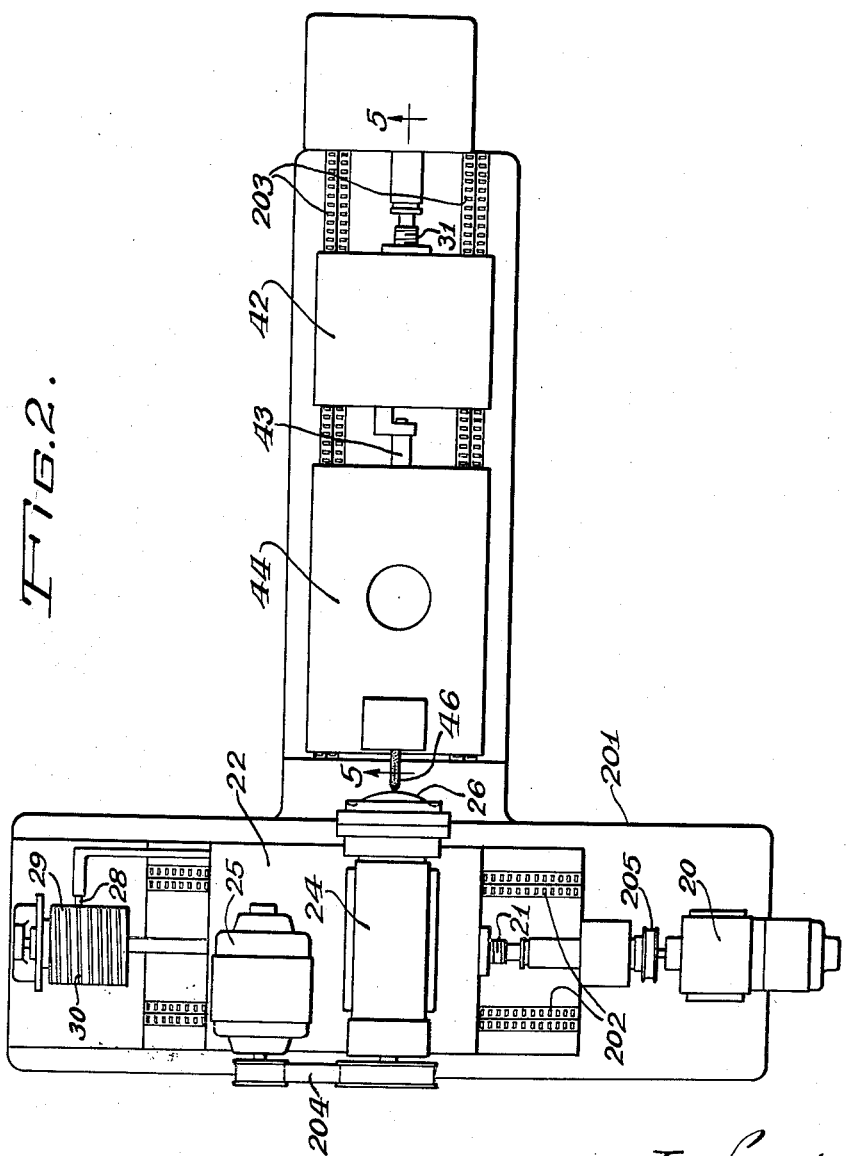

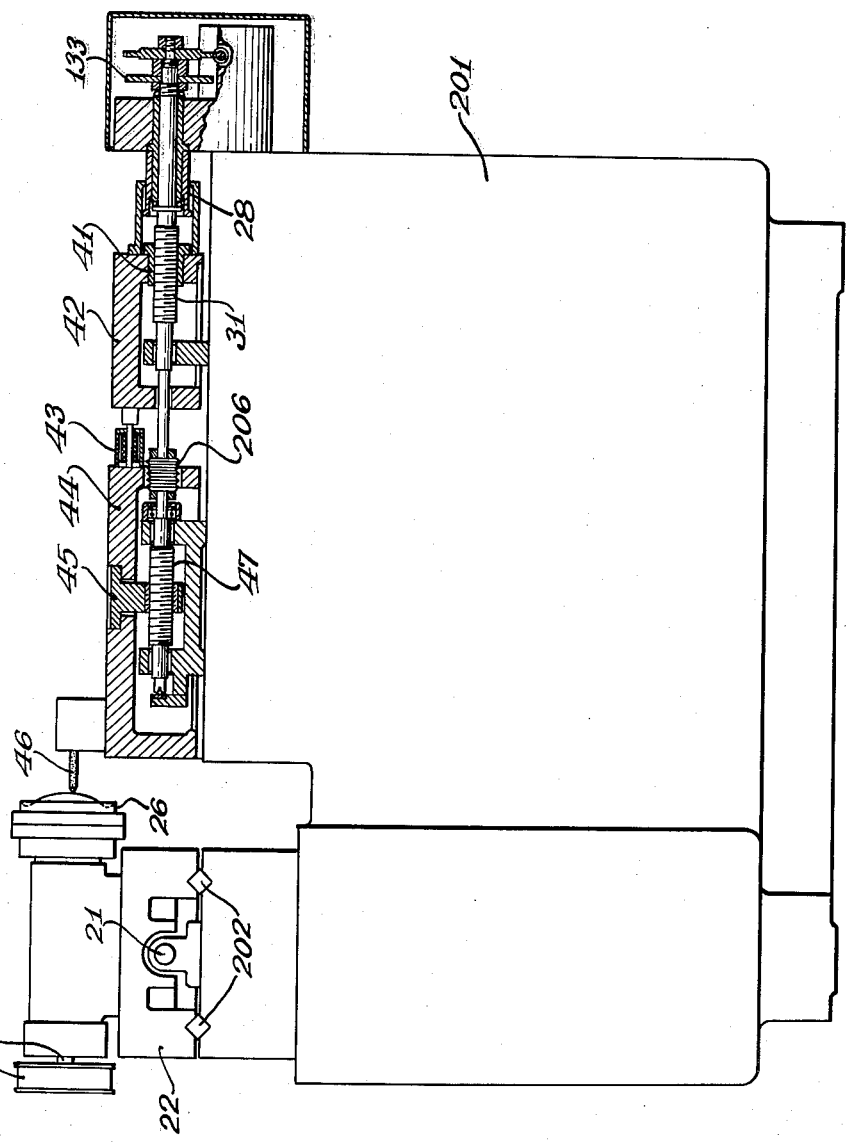

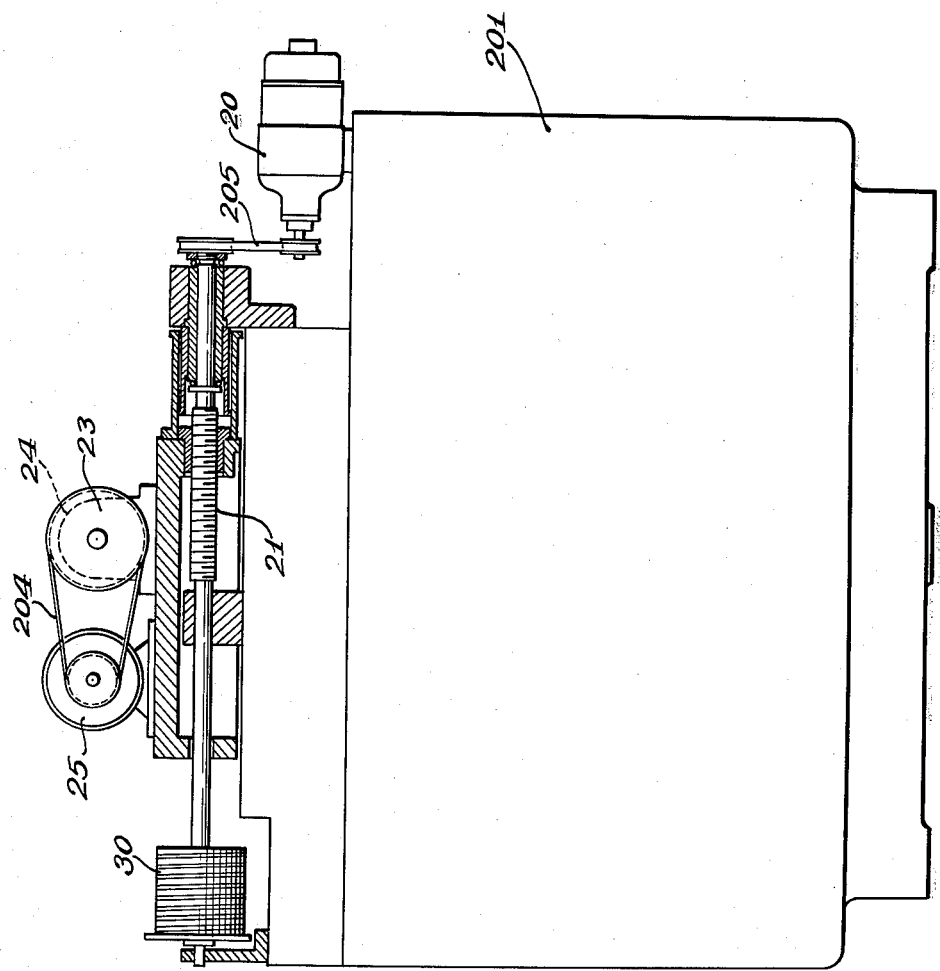

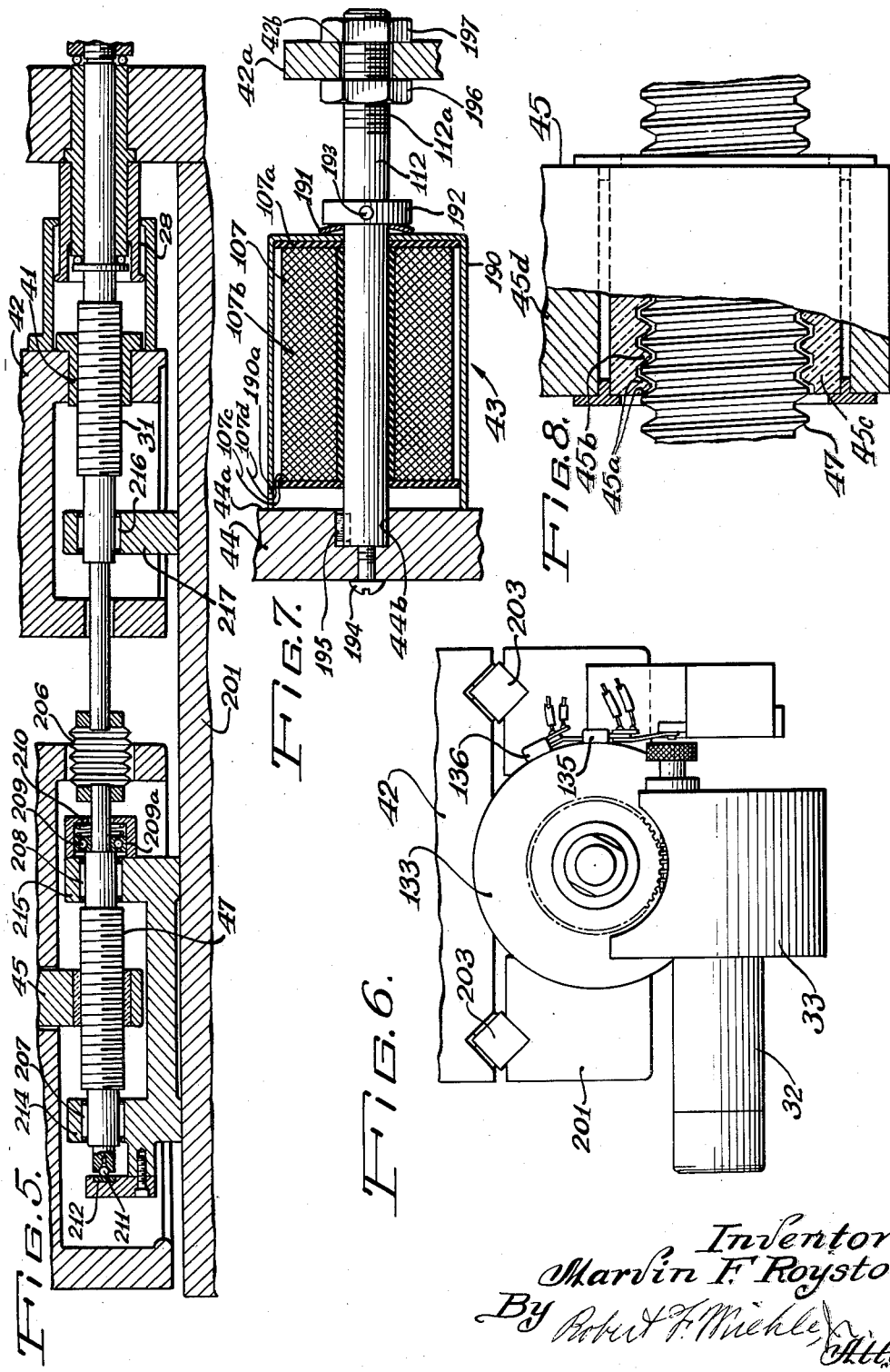

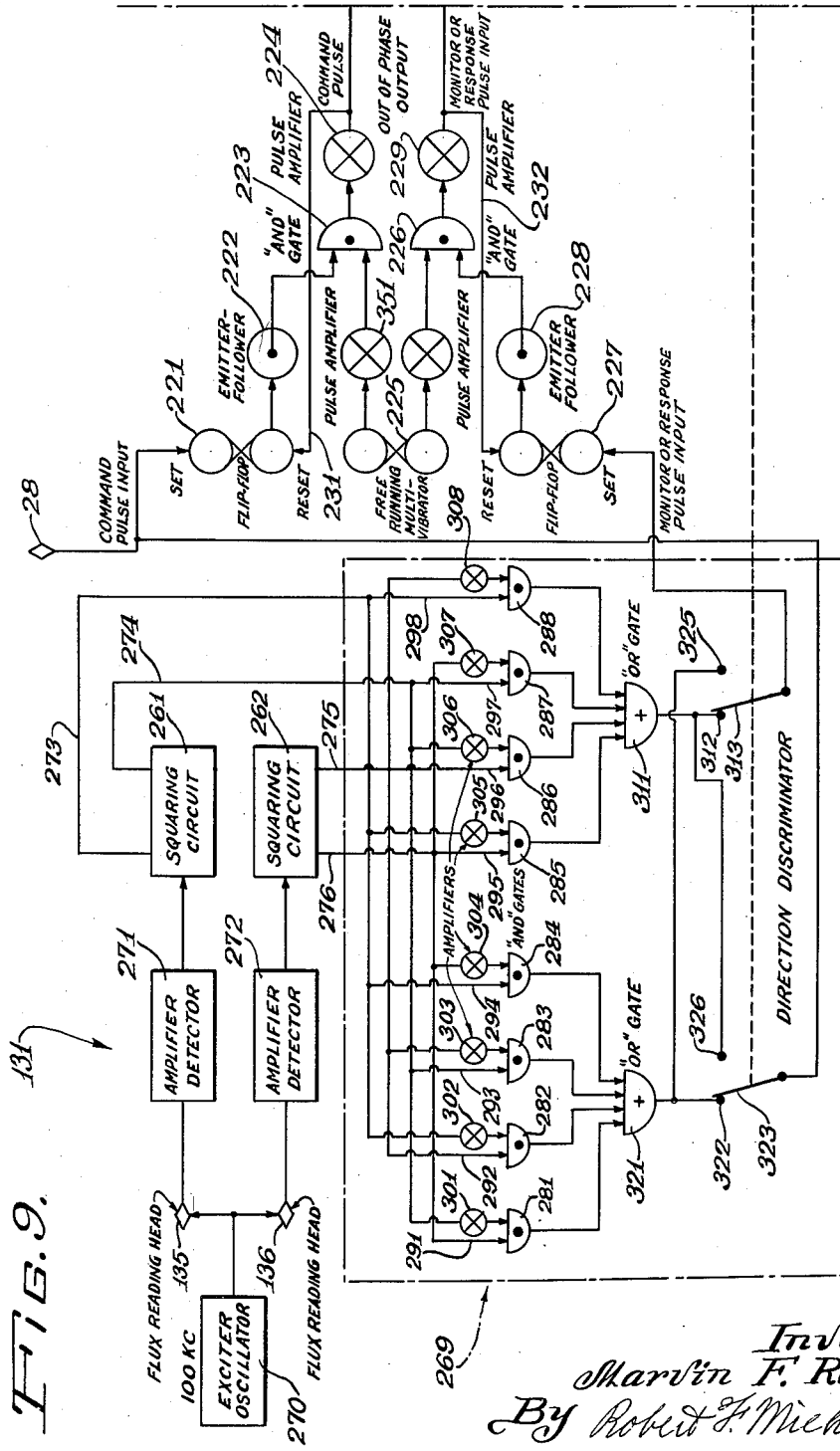

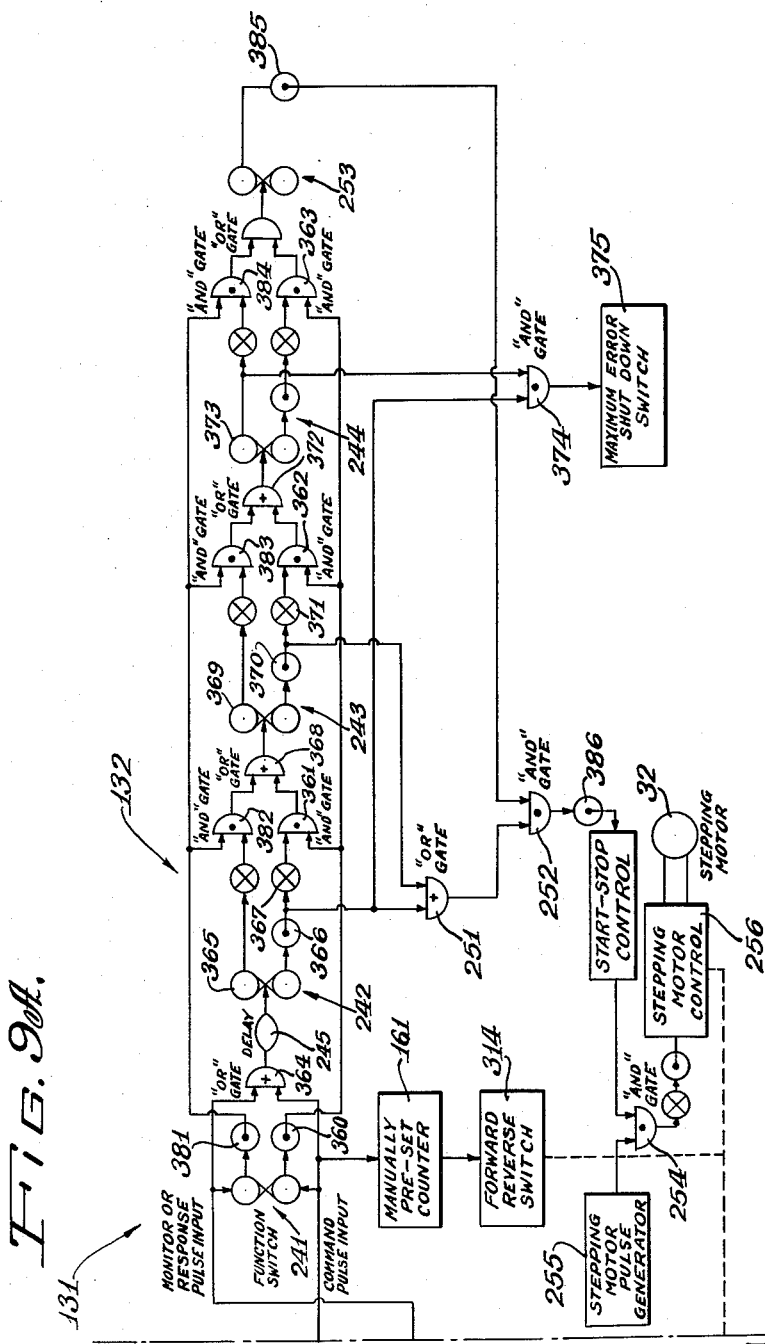

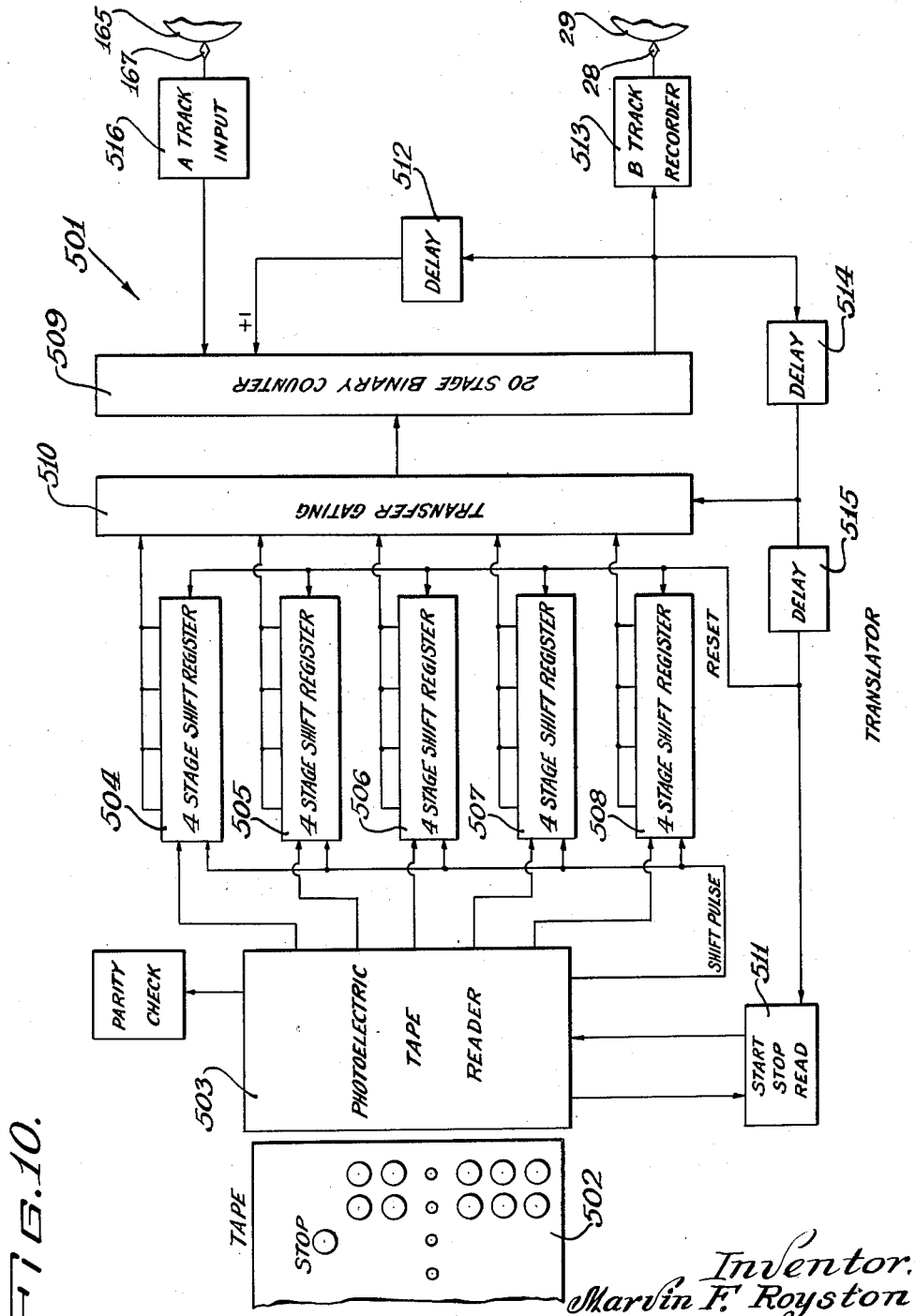

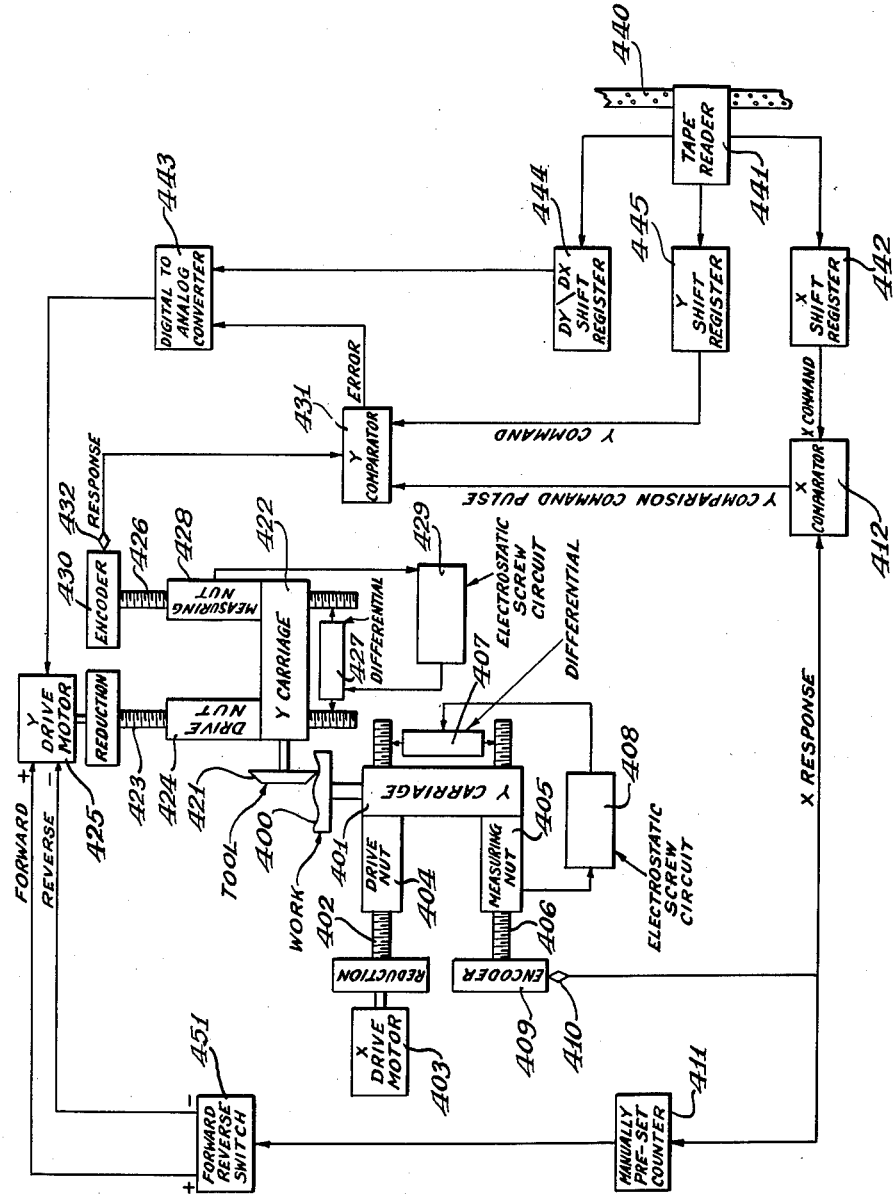

3,065,578
SIGNAL PATTERN CONTROLLED MACHINES
Marvin F. Royston, Skokie, Ill., assignor to Bell & Howell Company, Chicago, Ill., a corporation of Illinois
Filed Aug. 8, 1960, Ser. No. 47,992
16 Claims. (Cl. 51—165)

This invention relates to signal pattern controlled machines, and more particularly to signal pattern controlled machines for grinding aspheric lens surfaces.

An object of the invention is to provide new and improved contour producing machines.

Another object of the invention is to provide machines for contouring or shaping articles to accuracies of within one millionth of an inch.

Another object of the invention is to provide an apparatus for advancing a tool carriage in which the position of the tool is continuously sensed and is corrected automatically if the position is incorrect.

Another object of the invention is to provide an apparatus having a drive carriage together with a tool carriage connected to the driven carriage by a transducer, a measuring screw rotated in synchronism with movement of the drive carriage having electroconductive thread, the tool carriage having conductive thread portions interleaving the thread of the screw and forming a pair of capacitors therewith, and a bridge circuit responsive to unbalance of the capacitors for actuating the transducer to move the tool carriage relative to the screw and the drive carriage to rebalance the capacitors, thereby bringing the tool carriage to a precise desired position.

A further object of the invention is to provide apparatus for grinding an aspheric lens in which the lens blank is rotated, the blank and an abrading tool are moved relative to one another in a direction transverse to the axis of rotation of the blank, the tool and the blank are moved relative to one another parallel to the axis of rotation in response to a signal pattern in synchronism with the transverse movement, and errors in the parallel movement are sensed by an electrostatic capacitor screw and nut and are corrected by a transducer actuated by the screw.

Another object of the invention is to provide a new and improved electrostrictive transducer.

A complete understanding of the invention may be obtained from the following detailed description of machines forming specific embodiments thereof, when read in conjunction with the appended drawings, in which:

FIG. 1 is a schematic view of a portion of a signal pattern controlled machine forming one embodiment thereof and including a control circuit therefor shown partially in block diagram;

FIG. 2 is a top plan view of the machine of FIG. 1;

FIG. 3 is a front elevation view of the machine of FIG. 1;

FIG. 4 is a side elevation view of the machine of FIG. 1;

FIG. 5 is an enlarged vertical section taken along line 5—5 of FIG. 2;

FIG. 6 is an enlarged fragmentary end view of a portion of the machine of FIG. 1;

FIG. 7 is an enlarged longitudinal sectional view of a magnetostrictive transducer of the machine of FIG. 1;

FIG. 8 is an enlarged longitudinal sectional view of an electrostatic measuring screw and nut of the machine of FIG. 1;

FIGS. 9 and 9A show the control circuit of the machine of FIG. 1;

FIG. 10 illustrates a translator system for use with the machine of FIG. 1; and

FIG. 11 is a schematic view of a signal pattern controlled machine forming an alternate embodiment of the invention.

The invention provides signal pattern controlled machines which, in the shown embodiments, are for the purpose of abrading aspheric surfaces on lens blanks but may be used for many other purposes. In the machines shown, a blank rotating mechanism is moved continuously along the X axis at a constant rate of speed, and an abrading tool carried by a measuring nut is moved along the Y axis in synchronism with the movement of the blank along the X axis. Preferably the measuring nut is moved along the Y axis by a drive carriage driven by a feed screw precise within a given range of error, and a measuring screw coaxial with the measuring nut is rotated by the feed screw. The measuring screw has an electroconductive thread which overlap insulated electroconductive facings of the measuring nut and forms two capacitors therewith. Whenever the drive of the drive carriage is in error, the facings are not centered between the thread of the measuring screw and a bridge circuit connected to the capacitors to detect unbalance therebetween actuates a trigger circuit to pulse a magnetostrictive member coupling the drive carriage and the measuring nut to move the measuring nut relative to the drive nut in a direction such as to balance the two capacitors. Preferably a resistance capacitance network is provided between the trigger circuit and the magnetostrictive member to damp the pulses to the member to prevent overcorrecting.

The synchronization of the feed of the abrading tool relative to the advance of the blank rotating mechanism preferably is achieved by means of a command pulse pattern recorded in a spacing pattern on a helical magnetic track rotated by the drive of a carriage of the blank rotating mechanism. A magnetic head carried by the latter carriage picks up the command pulses from the track, and the pulses actuate an electronic switch to actuate a stepping motor constituting the drive of the feed screw to turn the screw through a predetermined angle for each pulse, thereby effecting the drive of the drive carriage, the measuring screw and the measuring nut which carries the tool. To insure that the feed of the tool does not overshoot or lag behind the feed of the work supporting carriage, there may be provided a monitoring circuit including a monitor cylindrical magnetic track rotated with the feed screw and having sine wave monitor pulses spaced therearound from each other at an angle equal to one quarter of the angle which the screw is rotated by one pulse of the stepping motor. Two magnetic heads are spaced around the monitor track to pick up simultaneously portions of the pulses ninety degrees out of phase with one. Thus, for each step of the stepping motor in which the monitor track is rotated through an angle of one quarter of the angle between adjacent monitor pulses and either a leading slope or a trailing slope of the sine wave monitor pulses is picked up by one of the magnetic heads and is transmitted to a bidirectional counter. Each command pulse also is fed to the counter, and, if there is a greater than a selected difference between the number of command pulses received by the counter than that of the monitor pulses, the counter actuates a shutdown switch to stop the machine.

Referring now in detail to the drawings, there is shown in FIG. 1 a motor 20, which is to rotate a very accurate work screw 21 continuously at a predetermined rate of speed. The screw extends along the X axis. Rotation of the screw advances a work carriage 22 along the X axis, and the carriage carries a spindle 23 thereon in a bearing structure 24 together with a spindle driving motor 25 to rapidly rotate the spindle together with a lens blank 26 carried by a blocking member or work holder 27 centered on and fixed rigidly to the spindle. As the carriage 22 is moved along the screw 21, a magnetic layer head 28 carried by the carriage travels along a helical magnetic record track 29 on a drum 30 fixed to and rotated by the screw 21. The pitch of the track 29 is identical with the pitch of the screw 21, and recorded pulses are spaced along the track in a predetermined pattern. These pulses are designated as command pulses and as each of these pulses is picked up by the head 28, a drive screw 31 is caused to be rotated through a predetermined small angle by a known stepping motor 32 and known reduction gearing 33. The drive screw is very precise and has an error within known limits.

The drive screw 31, when rotated, serves to drive a drive nut 41 along an axis which is designated the Y axis and is transverse to the X axis along which the work feed screw 21 extends. The drive nut is rigidly connected to a power carriage 42, which is rigidly connected by a magnetostrictive transducer device 43 to a tool carriage 44. The tool carriage 44 carries a measuring nut 45 and a known abrading tool 46 rigidly thereon. The tool 46 may be non-rotating as shown or may be rotated by a motor (not shown) on the tool carriage. The measuring nut 45 extends along a portion of a measuring screw 47, and, with the screw 47, forms an electrostatic screw measuring device of the type disclosed and claimed in co-pending application Serial No. 824,665, filed July 2, 1959, by Gerhard Lessman and assigned to the common assignee. The measuring screw is aligned with the drive screw 31 and is drivingly connected thereto by a bellows coupling 48. The pitches of the threads of the screws 31 and 47 and the nuts 41 and 45 are equal.

Threads 47a of the screw 47 and 45a of the nut 45 overlap one another and form two capacitors which are connected in adjacent arms of a bridge circuit 49. The capacitances of these two capacitors are equal only when the nut 45 is in the desired position thereof along the screw 47 and when the nut is in a position shifted along the screw 47 from its desired position, one of the capacitors increases in capacitance and the other decreases, both changes being proportional to the square of the distance of shift or longitudinal decentering. The bridge circuit 49 also includes equal resistors 50 and 51 in its other arms and is supplied with power from an oscillator 52, a voltage divider 53 and a transformer 54. The bridge also includes a trimming or balancing variable resistor 55 whose contactor 56 is connected to voltage divider 57 forming the output of the bridge circuit and receiving any error output from the bridge circuit due to any occurring inequality of the pair of capacitors formed by the threads 45a and 47a. An adjustable capacitor 58 is connected between one corner of the input of the bridge circuit and ground to set a predetermined unbalance in the bridge circuit when the measuring screw and measuring nut are centered longitudinally relative to one another.

Any error output of the bridge circuit 49 is fed to a known amplifier 71 adapted to amplify ten kilocycle frequency signals and having a rheostat 72 for initially adjusting the gain thereof. The amplified error signal is fed to a winding 73 of a transformer 74 which also has a center tapped winding 75. The center tapped winding 75 has its ends connected to a phase discriminator circuit 76 including resistors 77 to 80 and rectifiers 81 to 84 and connected at its input to center tapped secondary winding 85 of transformer 86, primary winding 87 thereof being supplied by the oscillator 52. The center of the winding 85 is supplied with a constant positive D.C. voltage by conductor 88 leading to a known D.C. source (not shown). The phase discriminator circuit serves to detect the error signal by the phase difference between the reference signal and the error signal. An input diode 97 cancels out any pulses from the bridge circuit which are due to lead of nut 45 from its desired centered position when the nut 45 is being driven to the left as viewed in FIG. 1. Normally such pulses from lead of the nut 45 do not occur because the nut 45 is coupled to the power or drive carriage 42 so that, with no current supplied to the coupling magnetostrictive device 43, the nut 45 will lag from its desired longitudinally centered position relative to the thread 47a of screw 47. However, this lag is never great enough to cause the thread 47a to engage the thread 45a of the nut. Hence, only error signal due to lag of the nut 45, the term lag being designated to be lag for driving movement of the nut 45 to left, is utilized for error compensation.

The lag and lead error signals are fed with the ten kilocycle frequency reference signal to a ten kilocycle filter 91 of a known type which filters out the reference signals leaving only the amplified error signals or pulses, which then are fed to a trigger circuit 92 of a known type. The trigger circuit includes transistors 93 to 96, diode rectifiers 97 and 98, resistors 99 to 105 and a capacitor 106. The rectifier 97 cancels out lead error signals. The trigger circuit is turned on when the D.C. input thereto rises above its threshold voltage, which occurs only for each error input pulse of a magnitude at least as great as that of an error pulse produced by a lag of that nut 45 from its desired position of one-half of one micro-inch. The output of the trigger circuit is applied to a winding 107 of the transducer 43 by means of a resistance-capacitance network 108 and a rectifier 109. The network 108 includes capacitor 110 and resistor 111 and serves to slow and prolong the application of the error correcting power to the transducer 43. Current through the coil 107 cause magnetostrictive core 112 to elongate in accordance with the power supplied to the coil 107, and the core 112, which rigidly connects the carriages 42 and 44 pushes the carriage 44 to the left, as viewed in FIG. 1, toward its desired position in which the thread 45a of the nut 45 is longitudinally centered relative to the thread 47a of the measuring screw 47. The duration of the power pulses of the trigger circuit are dependent on the duration of error signals coming to the trigger circuit. Normally sufficient correction to the nut 45 to bring the error under one-half micro-inches occurs almost instantaneously, and the trigger circuit is shut off. However, power continues to be supplied to the transducer from the resistance-capacitance circuit 108 in magnitude and duration dependent on the time constant of the circuit 108, which has the effect of keeping the nut 45 (and thereby the tool 46) within the one-half micro-inch range of accuracy for a longer period of time. The circuit 108 and the magnitude of the power output from the trigger circuit 92 are such that overshooting is prevented and hunting is minimized.

Synchronization of the drives of the feed screws 21 and 31 is effected by a numerical control system 131 driving the screw 31 in response to command signals caused by selected rotations of the screw 21. The control system is disclosed in detail and certain features thereof are claimed in co-pending application Serial No. 47,993, filed by Du Wayne E. Stevens on the same date as the present application and assigned to the common assignee. The command pulses recorded on the helical magnetic track 29 are spaced apart selected angle according to the desired pattern.

The recording head 28 is carried with the carriage 22 so that it is maintained in engagement with the helical track, and as each recorded pulse on the track 29 comes to the head 28, the pulses is fed to a bidirectional counter 132. Since wave slave pulses are recorded on a track 133 on drum or disc 134 fixed to the screw 31. The sine wave is such that each crest is spaced from the succeeding (or preceding) crest the same predetermined angle which is equal to four times the angle through which the screw 31 is turned upon each stepping of the motor 32, which angle of screw movement moves the tool 46 a distance of two and one-half micro-inches along the Y axis. Each time either a trailing edge or a leading edge of the sine wave on the track 133 travels past either playing magnetic head 135 or playing magnetic head 136, it sends a monitor pulse to the counter 132. The crests of the sine wave record on the disc 134 are spaced equally from each other completely around the periphery of the disc 134. The head 135 is spaced from the head 136 such a distance that the heads 135 and 136 are ninety degrees out of phase with respect to the sine wave on the track 133, and when either a trailing edge or a leading edge of the sine wave is picked up by the head 135 or the head 136 a pulse is sent to the counter 132. This arrangement of the heads 135 and 136 is a frequency multiplying system, four pulses being produced by each cycle of the sine wave.

When the counter 132 has received a command pulse from the head 28 and then receives a monitor pulse from one of heads 135 and 136, the counter 132 actuates a pulse generator 137 to actuate an electronic switching circuit 138 to send a driving pulse to the stepping motor 32 to step the drive screw 31 through an angle corresponding to one quarter of the angle subtended by one cycle of the sine wave on the disc 134. Each such step of the drive screw 31 is designated one increment of Y axis travel for the tool 46, and any error within the designated range either in the stepping motor drive or in the drive of the screw 31 is detected by the measuring nut 45 and screw 47 and is corrected by the transducer 43 as described above. The command pulses from the track 29 represent predetermined distances of travel of the work or blank 26 along the X axis.

To reverse the direction of travel of the tool 46 along the Y axis at a predetermined point in the cutting or turning operation, an electronic settable counter 161 is provided. The counter 161 receives each monitor pulse from the disc 134, and after the number of pulses for which the counter 161 is set has been received by the counter 161, it actuates the switch 138 to reverse the polarity of the driving pulses to the motor 32 to thereby reverse the direction of drive of the drive screw 31. Then for each pair of command and monitor pulses received by the counter 132, the motor 32 is stepped to move the tool 46 to the right, as viewed in FIG. 1.

The function of the monitor pulses from the disc 133 is to stop the motor 32 after each actuation thereof by a command pulse after the screw 31 has been rotated through the desired angle. The effect of the monitor pulses also is to stop the entire machine in the event that, due to some malfunction, the drive of the tool 46 either overshoots or lags too far behind the drive of the work by the screw 21. If a selected number of successive command pulses are received by the counter 132 with no intervening monitor pulse, the counter 132 pulses a shutdown switch 162 to shut off power from the motors 20 and 25. Likewise, if two successive monitor pulses are applied to the counter 132 with no intervening command pulse, the counter 132 sends an actuating pulse to the electronic switch 162 to stop the motors 20 and 25.

To initially record the pulse producing signals on the magnetic track 29 in the desired pattern to cause the machine to produce the aspheric curve 26a, there may be utilized a translator system disclosed and claimed in my co-pending application Serial No. 48,007, filed on the same date as this application and assigned to the common assignee. This translator system is actuated by a tape perforatel to cause electromagnetic pulses in a magnetic recorder thereof which has a recorder head in the position of the head 28 to be recorded on the track 29. The translator is set up by the tape to supply a command pulse to the track 29 when the translator receives a selected number of pulses from a set up disc 165 having a magnetic recorder track 166 and a playback head 167. The disc 165 is key to the screw 21 and the track has a recording thereon which produces an output pulse in playback head 167 each time the screw 21 turns through a predetermined angle. The perforated tape sets up the translator system so that with the pulses from the disc 165, the selected pulse-producing patern on the track 29 is produced. The pulses from the disc 165 may be considered as counter pulses, one pulse for each turn of the screw 21 through a very small predetermined angle. The translator system is actuated by the perforated tape to record output pulses on the track 29 after receiving selected numbers of counter pulses from the disc 165, the number of counter pulses for each succeeding output pulse being determined by the perforated tape to produce the desired pattern of spacing of the pulses on the track 29.

The structural features of the machine are shown in more detail in FIGS. 2 to 6. The machine includes a T-shaped, rigid frame 201 on which X axis roller bearing ways 202 and Y axis roller bearing ways 203 are provided to slidably support the work carriage 22, the drive carriage 42 and the tool carriage 44. The frame also supports the X axis feed screw 21 for rotation and against longitudinal movement thereof, and the screws 31 and 47 rotatably and against longitudinal movement. The motors 20 and 32 and the gear box or reducer 33 also are supported in fixed positions on the frame 201. The motor 25 is supported on the carriage 22, and preferably drives the spindle 23 by a belt drive 204, the motor 20 also having a belt drive 205.

The bearing support structure of the screws 31 and 47 together with the bellows connection 48 between the screws 31 and 47 and the transducer 43 are illustrated in FIGS. 3 and 5. The screw 47 is rotatable in precision radial bearings 207 and 208 and also in a precision thrust bearing 209, the outer race 209a of which is urged toward the left, as viewed in FIG. 5, by springs 210 to maintain a very hard, abrasion resistant, thrust ball bearing 211 carried rotatably in a socket in the end of the screw 47 against a very hard, abrasion resistant, reference position plate 212. The plate 212 and the bearings are supported by rigid posts 213, 214 and 215 rigid on the frame 201. The screw 31 is mounted similarly in a precision radial bearing 216 supported by post 217 rigid on frame 201 and by a precision radial-and-thrust bearing 218. The screws 31 and 47 are connected together against any relative rotational movement relative to one another by the bellows 206, which does isolate these screws from one another as to longitudinal thrust, thereby permitting the separate thrust mounting systems of the two screws.

FIG. 7 illustrates the transducer 43 connecting the power carriage 42 rigidly to the tool carriage 44 by means of a bracket 42a of the power carriage. The magnetostrictive core 112 is of a well known type which elongates in accordance with the strength of the magnetic field applied thereto. The electromagnetic coil 107 includes a spool 107a of thermoplastic material and a winding 107b of an insulated conductor. The spool fits snugly but slidably on the core 112. A cup-shaped shield 190 of soft iron or the like fits closely but slidably on the core 112 and is urged by a leaf spring washer 191 to the left against wall 44a of the carriage which is of steel to form with the shield 190 and the core 112 a low reluctance path. A collar 192 fixed to core 112 by set screw 193 acts as a seat for the washer 191. The core 112 is fixed rigidly to the carriage wall 44a by screw 194 threaded into a tapped bore in the end of the core 112, the core 112 fitting into counter-bore 44b and keyed to the wall 44a by key 195. The bracket 42a rigidly fastened to the carriage 42 has bore 42b through which a threaded end portion 112a of the core 112 extends. Nuts 196 and 197 threaded on the end portion 112a adjustably lock the core 112 to the bracket 42a. By this means, the carriage 44 may be manually adjusted initially relative to the measuring screw 47 (FIG. 1) to cause the thread 45a of the nut 45 to be positioned to the right of center, as viewed in FIG. 1, relative to the thread 47a of the screw 47. This adjustment is made with no flux in the core 112 and so that the drive screw 31 will never move the thread of the nut 45 to the left of its centered position relative to the thread of the screw 47 with no flux in the core 112, the transducer 43 serving to keep the nut thread 45a centered relative to the screw thread 47a. The shield 190 has a notch 190a through which insulated lead wires 107c and 107d of the winding extend.

The electrostatic nut 45 and screw 47 per se are disclosed and claimed in above mentioned Lessman co-pending application Serial No. 824,665 and assigned to the common assignee, and are shown in FIG. 8. The screw 47 is of electroconductive material and its thread 47a is extremely accurate as are the electroconductive faces 45a of the thread 45b of the nut 45. The two faces 45a are positioned on opposite faces of the thread 45b which forms a part of a nut portion 45c of electrical insulating material such as glass or other suitable dielectric material. The nut portion 45c is precisely held by holder portion 45d in precise concentric relation to the screw 47. The nut portion 45c is very precise and is quite elongated so that any slight, non-accumulative errors in the threads 45b and 47a are averaged out and eliminated.

The phase discriminator network 76 (FIG. 1) has the effect of greatly multiplying the sensitivity of the Wheatstone bridge circuit so that unbalance of the bridge from the nut thread 45b being longitudinally decentered relative to the screw thread 47a just sufficient to cause a few degrees of one cycle difference between the phase of the output of the bridge and that of the output of the oscillator 52 will cause a signal of sufficient magnitude to actuate the trigger circuit 92. The amplifier 71 brings the amplitude of the error signal from the bridge to substantially the same amplitude as that of the reference signal from the oscillator 52 applied to the phase discriminator network. Hence, the output of the phase discriminator to the trigger circuit is dependent only on the phase difference (which varies with the degree of unbalance) between the error signal and the reference signal.

To prevent loss of either a command pulse or a monitor pulse when the two pulses come to the counter 132 simultaneously, an anti-coincidence circuit forming the input of the counter 132 is provided and is shown in block diagram in FIG. 9. The command pulse comes in to a flip-flop circuit 221 to set the circuit to apply a signal voltage to an emitter follower circuit 222 and an "and" gate circuit 223. Before the pulse signal is applied to amplifier 224 and on into the counter 132 to actuate the counter, a pulse from a free running multivibrator 225 must be applied to the "and" gate 223, and the multivibrator alternately pulses the "and" gate 223 and "and" gate 226. Similarly, the monitor pulse actuates a flip-flop circuit 227 to set the circuit 227 in a pulse transmitting condition, and the pulse signal is fed through an emitter follower circuit 228 to "and" gate 226. When "and" gate 226 is so pulsed by the circuit 227 and is also pulsed by the multivibrator 225, a pulse is fed into the bi-directional counter 132 through amplifier 229. Each of the circuits 221 and 227 is set to a signal sending condition by receiving a pulse and stays in that condition until reset by a reset connection 231 or 232 as the pulse signal is transmitted from the amplifier 224 or 229 to the counter. Thus, the command and response or monitor pulses are always spaced apart as they are fed further into the bi-directional counter 132 even though arriving simultaneously at the anti-coincidence circuit. The free running multivibrator has a frequency several times as great as the maximum frequency of either the command pulses or the monitor pulses so that there is never any danger of losing a pulse.

The bi-directional counter 132 is connected such that the command pulses generated by the rotation of the drum 30 on the X axis lead screw 21 cause the count to add, and the monitor or response pulses generated by the responding rotation of the monitor disc or quantizer 134 on the Y axis subtract from the command count. Thus, the system strives to maintain zero balance in the counter 132 at all times. The scheme of the counter is shown in FIG. 9A. Entry of a command pulse causes a binary switch 241 to flip, and set up the interstage gating between the counter flip-flop stages 242, 243 and 244 such that a carry pulse is transferred and the counter adds. Likewise, entry of a response or monitor pulse will shift the switch to the opposite condition, which causes the carry-borrow gating of the counter to transfer a borrow pulse and the counter subtracts by one count. The binary switch operates at a much faster speed than the counter flip-flops 242, 243 and 244 because of a known delay circuit 245 so that the gating is completed before the first counter flip-flop 242 can change state.

In monitoring the counter 132 to determine whether a command signal is present, the "one" state of all the binary stages is fed through an "or" gate 251 such that any value of a plus count registered will send a command signal to the stepping motor. To detect any possible overshoot of the response of monitor disc 134 by one increment which would cause the count to become negative, it is necessary to distinguish between a plus and a minus count. A minus count must not be recognized as a command signal. The output from the "or" gate 251 is fed to one leg of an "and" gate 252. The second leg of gate 252 is controlled by a flip-flop stage 253 located in the counter beyond that of the maximum tolerable error in the system. The only time the flip-flop stage 253 will ever change from a "zero" to a "one" state is when the counter changes from a zero to a minus one count. The command signal is therefore inhibited on any negative or zero storage in the counter 132. A plus storage, however, opens gates 252 and 254 and allows plus generator 255 to step the motor 32 through a known control circuit 256.

One of the problems of readout in shaft angle quantizers, as in the disc 134 where high packing densities and slow speeds are involved, is that of mechanical vibration. The vibrations can momentarily reverse the direction of the coded disc 134 and cross the sharp leading or trailing edge of a pulse. Known type of trigger squaring circuits 261 and 262, which may be Schmitt trigger circuits, will recognize these extraneous pulses as forward motion of the quantizer disc 134, and a large error could be accumulated in a short time. This is especially true as far as the shallow slope portion of the aspheric lens is concerned. In order to prevent this type of error, a direction discriminator circuit is incorporated as shown in FIG. 9. The reverse direction pulses are fed into the opposite side of the counter 132 to cancel any forward pulses that may be generated because of vibration. An example of this action is as follows: Let us take a point along the curve 26a where the "Y" increments are widely separated. Now suppose a command pulse enters the counter 132, producing an output which drives the stepping motor 32 until one response or monitor pulse nullifies the command pulse and the motor stops 32. Further, suppose the disc 134 stops just beyond the threshold of the pulse just received. Any slight vibration could cause the disc 134 to oscillate back and forth through this threshold producing a series of unwanted response pulses. Therefore, each reverse direction pulse is fed to the counter 132 in such a manner as to count upward and each forward pulse counts downward we end up with the same number of effective monitor pulses as there are command pulses, which is necessary if an accumulative error is to be averted. To carry the reasoning on step further, if the period of oscillation is slow the disc 134 may back up, giving a negative pulse, and stay there long enough to trigger the stepping motor 32 one or two steps, representing less than one space between pulses or increments, this would carry the disc 134 in a forward direction beyond the pulse threshold in question, producing a pulse which nullifies the pulse created by its backward swing. Thus, the pulse in question would be used only once, which is as it should be.

The direction discriminator circuit 269 also includes means adapted to amplify, square and differentiate the sine wave signals from the disc 134 and the flux reading heads 135 and 136. A high frequency carrier signal is supplied by known exciter oscillator 270 to the heads 135 and 136 and the mixed amplitude modulation carrier signal and much lower frequency response or monitor signals are fed along parallel paths from the heads to the known pulse squaring circuits 261 and 262 through known amplifier-detectors 271 and 272, which amplify the received mixed signals and detect the monitor pulses. The two amplified sine wave monitor signals are fed to the circuits 261 and 262 ninety degrees out of phase, and the circuits square these waves to provide square wave outputs.

The outputs of the circuits 261 and 262 are identical except that the output signal from one of these circuits lags that from the other by ninety degrees and are gated and differentiated similarly in the direction discriminator circuit 269. Hence, only the gating and differentiation of the output of the squaring circuit 261 will be described in detail. A square wave output signal is fed by the circuit 261 to conductor 273, and an identical square wave output signal one hundred and eighty degrees out of phase from that fed to conductor 273 is supplied to conductor 274. These two square wave signals are differentiated at the leading edges thereof to produce signal pulses and the differentiated pulses from the signals from the circuit 261 are gated by the similar output signals from the circuit 262, the latter signals being ninety degrees out of phase from the signals of the circuit 261 so as to provide excellent gating for the differentiated pulses from the circuit 261. The circuit 262 feeds square wave signals one hundred and eighty degrees out of phase from one another to conductors 275 and 276, these signals lagging the corresponding signals on the conductors 273 and 274 by ninety degrees.

"And" gates 281 to 288 have gating pulse inputs 291 to 298 and amplifiers 301 to 308 provide signal pulse inputs to the gates 281 to 288. The amplifiers 301 to 308 are of a type which will differentiate the positive going leading edges of the pulses from the squaring circuits 261 and 262 and pass the resulting differentiated pulses to the "And" gates 281 to 288 for transmission through these gates when proper gating signals are being applied to these gates simultaneously therewith. The amplifiers 301 to 308 will not form and transmit pulses from the negative going trailing edges of the square wave pulses. Thus, as one of the square wave pulses goes from its low voltage level to its high voltage level, the amplifiers to which it is transmitted transmit pulses to the "And" gates, and, conversely, whenever one of the square wave pulses goes from positive to negative, the amplifiers receiving that signal do not transmit any pulse to the "And" gates at their outputs.

Assuming the drive of the tool 46 to be forward (to the left, as viewed in FIG. 1) and the disc 134 to be moving in the forward direction, while the square wave pulse on the conductor 273 (FIG. 9) is at its gating voltage level, the square wave pulse on conductor 275 changes sharply in its voltage level to the proper direction to actuate the amplifiers. As these two conditions occur, the gate 288 receives the pass or gating signal from conductor 273 and the signal pulse from conductor 275 and amplifier 308 and the response or monitor signal passes on through the gate 288, "Or" gate 311, relay contact 312 and contactor 313 of the stepping motor control 256 as actuated by the forward reverse switch 314, to the flip-flop circuit 227. While the pass gating signal on the conductor 273 at this time also is applied to the gate 284, the signal on the conductor 276 is changing in a direction opposite to that necessary to actuate its associated amplifiers which will not pass this type of pulse. Next, on further forward rotation of the disc 134, the signal on the conductor 274 goes sharply in the proper direction to actuate the amplifiers connected therewith while the signal on the conductor 273 does the opposite, and, the signal on the conductor 275 being in the central portion of its gating level, a response or monitor pulse is passed through gates 286 and 311 to the flip-flop circuit 227. Next, on further forward rotation of the disc 134, the gate 287 receives its gating signal from the conductor 274 and the response pulse from the conductor 276 and the amplifier 307 and passes the response pulse to the flip-flop circuit 227, the signal pulse to the amplifier 304 being such as to pass the amplifier 304 and gate 284 but there is a not pass or non-gating signal on the conductor 273 at this time so that no signal passes gate 284. Also, at this time, the pulse signal from the trailing edge of the pulse on conductor 275 will not pass the amplifiers 303 and 308, and the signals on the conductors 273 and 274 are not changing so that no pulses are formed by amplifiers 301, 302, 305 and 306. Next, on further forward rotation, the voltage level on the conductor 273 rises sharply from its low level to its high level and, the voltage level at this time being at the gating level on the conductor 276 to provide the gating pulse to gate 285, a response or monitor pulse passes through the gates 285 and 311 and the contacts 312 and 313 to the counter 132 to actuate the counter. The other signals on the other conductors 274 and 275 are such that no other signal passes the other gates 281 to 284 and 286 to 288, the voltage level on the conductor 275 being steady but non-gating and the pulse on the conductor 274 being of polarity which will not go through the amplifiers 301 and 306.

If the disc 134 should now reverse its direction just after the response pulse passed through the gate 305, the level on the conductor 276 still is at gating and that on the conductor 275 is non-gating. However, on the reverse rotation of the disc 134 the signal or response pulses on the conductors 273 and 274 are opposite to that just described above, the sharp change in voltage level on the conductor 274 being such as to actuate the amplifier 301 to feed a response pulse to the gate 281 and that on the conductor 273 being of the opposite direction such as to be unable to pass through its associated amplifiers 302 and 305. The response pulse from the gate 281 passes through "Or" gate 321 and relay contact 322 and relay contactor 323 of the stepping motor control 256 to the flip-flop circuit 221 of the counter 132, which acts as a subtracting pulse on the counter as described above. Continuing in the reverse direction of the disc 134 for the remainder of the cycle, first the voltage level on the conductor 275 changes in the proper direction to actuate its amplifiers 303 and 308, only the gate 283, however, receiving a gating pulse. Then the voltage level on the conductor 273 changes sharply in the direction such as to actuate the amplifiers 302 and 305 to form response pulses. However, the voltage level on the conductor 276 at this time is non-gating and only that on the conductor 275 is gating so only gate 282 passes the response pulse which travels to the flip-flop circuit 221 to act as a subtracting pulse to the counter 132. Next, there is an amplifier actuating voltage change on only the conductor 276 and only the conductor 273 is at the gating level so only the gate 284 passes a response or monitor pulse and this pulse travels to the flip-flop circuit 221 to act as a subtract pulse to the counter 132.

The above description illustrates the action of the direction discriminator 269 when the relay contactor 313 and 323 are set in the forward direction of movement for the tool carriage 44. However, if the curve 26a is to reverse its slope at a predetermined point in the travel of the lens blank 26 along the X axis, the counter 161 is set to actuate the switch 314 after the counter 161 has received a predetermined number of command pulses corresponding to that point in the travel of the work along the X axis. When the counter 161 receives the last of these pulses, it actuates the forward-reverse switch 314 to actuate the stepping motor control 256 to reverse the direction of drive of the stepping motor 32 and move relay contactor 313 away from contact 312 and into contact with contact 325 and relay contactor 323 out of engagement with contact 322 and into engagement with contact 326. This causes the response or monitor pulses from the gates 281 to 284 now to go to the flip-flop circuit 227 to act as true response pulses and the gates 285 to 288 to be connected to the flip-flop circuit 221 to pass subtracting pulses to the counter 132 in the event the disc should accidentally rotate in the forward direction. It should be noted that only pulses occurring from reverse rotation of the disc 134 pass through the gates 281 and 284 while only pulses occurring from forward rotation of the disc 134 pass through the gates 285 to 288.

To illustrate the operation of the counter 132 in more detail, the following description is being made. Assuming that the movement of the work carriage is occurring along the X axis and, due to a breakdown or faulty operation, the tool carriage is not being fed so that a series of command pulses come to the counter 132 with no alternate response or monitor pulses being received, each command pulse actuates the flip-flop circuit 221 to produce a gating pulse to the emitter-follower circuit 222 and the gate 223 to cause the latter to pass a signal pulse from the multivibrator 225, which is amplified, resets the flip-flop circuit 221, and actuates the binary counter circuit 241 to apply a gating level voltage through emitter-follower circuit 360 to "And" gates 361, 362 and 363. The command pulse also goes through "Or" gate 364 and the time delay circuit 245, which delays it a few microseconds, after which the pulse goes to a flip-flop or binary counter circuit 365 to change the circuit 365 from a zero condition to a plus one condition. This is a negative going change which will not go through the gate 361. The next and second command pulse, assuming no intervening response pulse, actuates the circuit 222 to provide a gating pulse to pass the multivibrator pulse which resets the circuit 221, actuates the circuit 241 to apply a gating level to the gates 361, 362 and 363, and passes through gate 364 and delay circuit 245 to the flip-flop circuit 365 to change the circuit 365 from its plus condition of a low voltage level to its zero condition of a high voltage level. This change is of the proper direction to cause a pulse to travel through emitter-follower circuit 366, pulse amplifier circuit 367, the "And" gate 361, "Or" gate 368 and actuates flip-flop circuit 369 of counter stage 243. This changes the circuit 369 from its zero condition to its plus one condition, which change is negative going and not proper to travel through emitter-follower circuit 370, amplifier 371 and gate 362 and the circuit 369 stays in its plus condition. The next or third command pulse actuates the counter 365 from zero to plus, no pulse traveling through gate 361, to register a count of three on the counters 242 and 243. Then the fourth command pulse goes through the gates 361 and 368 to change the circuit 369 from plus back to zero, this change being from a low voltage level to a higher one to provide a pulse of correct polarity to pass the "And" gate 362 and "Or" gate 372, which it does to actuate flip-flop circuit 373. The circuit 373 then applies a gating pulse to "And" gate 374. On the next or fifth consecutive command pulse, the counter 242 sends a signal pulse through the gate 374 to actuate a known switching circuit 375 to stop the drive motor of the work feeding carriage, which stops the entire machine.

If, before the fifth consecutive command pulse occurs, a monitor or response pulse occurs, the response pulse actuates the flip-flop circuit 241 to apply a gating pulse through emitter-follower circuit 381 to set up gates 382, 383 and 384. This response pulse also travels through the gate 364 to actuate the flip-flop or binary counter circuit 365 to reverse its state, thereby subtracting one from the counter circuit 365. Further response pulses further subtract from the counters.

If at any time, with the counters 242, 243 and 244 at zero count, a response pulse occurs, it actuates the flip-flop circuit 241 to reverse its condition to send an enabling gating pulse to gates 382, 383 and 384. The response pulse also actuates the flip-flop circuits 365, 369, 373 and 253 consecutively, the pulse outputs of the flip-flop circuits 365, 369 and 373 being of the proper polarity to pass the respective gates 382, 383 and 384. The pulsing of the flip-flop circuit 253 causes it to go to a non-gating voltage level through emitter-follower circuit 385 to "And" gate 252 which passes a signal thereon from the circuit 365. This passed signal goes through emitter-follower circuit 386 from which it goes as a non-gating signal to block motor stepping pulses from the motor pulse generator 255 so that there is no feed of the tool 46 along the Y axis until the work feed along the X axis catches up and in doing so feeds two command pulses to the counter 132, the first of these serving to reverse the circuit 241 to take the gating pulse off the gates 382, 383 and 384 and reverse the circuit 365, thereby setting the counter to zero from its previous minus one count condition. The second command pulse then actuates the counter 132 and applies a gating pulse to the gate 254 to permit the normal three pulses from the generator 255 to pass to the stepping motor control 256 and the motor 32.

A translator system 501 (FIG. 10) is disclosed in detail and claimed in co-pending application Serial No. 48,007, filed on the same day as this application by myself and assigned to the common assignee.

Code perforated paper tape 502 from a known lens design computer contains binary coded information. Each word of information contains the total number of pulses which should come from equally spaced pulses on the disc 165 before a command pulse is to be recorded on the drum 29. The first line on the tape contains the binary numbers from $2^0$ to $2^4$, the second line up to $2^9$, and so on. One row is reserved for the stop code at the end of each word.

A known photo-electric tape reader 503 having a head (not shown) uses silicon readout cells for maximum reliability. Upon initiating a "start read" signal, the reader moves the tape 502 to the first line of holes. The stop control of the reader utilizes the smaller sprocket holes to insure proper alignment of the larger holes for readout. The readout signals are impressed on the "set" side of the first flip-flops in the first of five known four-stage shift registers 504 to 508. The shift signal then transfers this data to the second stage flip-flop and the tape moves to the second line. This procedure repeats itself until the entire word has been read out and all the data stored in the proper register. The data is now transferred into a known twenty-stage binary counter 509. Since the data stored in each stage of the register is unrelated to its adjacent stages, it is then transferred to the proper stage of the counter to again form the exact numerical figure as was punched in the tape. The data is transferred in parallel via a known transfer gating system 510. The transfer signal is also delayed in time and used to reset the registers 504 to 508 and to start the tape reader by means of control circuit 511 to read out and store the second word of information. Meanwhile, the feed screw 21 is rotated to rotate disc 165 which has equally spaced magnetic pulses on the periphery thereof and the read head 167 and a known amplifier 516 transfers the pulses into the counter 509 serially. The actual information transferred into the counter 509 is the complement of the number concerned and the pulses from the disc 165 add to this complement to fill up the counter 509. The extra one pulse needed to overflow the counter 509 to give a pulse output at the last stage is obtained from delayed transfer pulse circuit 512 and is fed into the first stage as shown in FIG. 10. Upon completion of the count, the overflow pulse is sent to the command track recorder 513 which is recorded on the magnetic drum 29. The overflow pulse is also delayed in time by delay circuits 514 and 515 and becomes the next transfer pulse, the reset pulse, and the start-read signal to the tape reader 503. Sufficient delay times are used to insure proper timing.

The circuit constants and structural details of the circuit shown in FIG. 1 are given merely by way of example and are not intended to limit the invention in any way.

In the machine shown in FIG. 11 forming an alternate embodiment of the invention, a work spindle device 401 rotates a lens blank 400 and is moved along the X axis by a drive screw 402 driven continuously by a motor 403 and a drive nut 404 rigid with the work spindle device. An electrostatic measuring nut 405 is carried rigidly by the nut 404, and an electrostatic screw 406 is driven by a known adjustable differential 407. A measuring screw circuit 408 similar to that disclosed in FIG. 1 detects longitudinal decentering and actuates the differential 407 to correct the decentering, the differential serving when adjusted merely to rotate the screw 406 slightly relative to the screw 402. A disc 409 having equally spaced pulses is driven by the screw 406 to send a pulse through flux reading head 410 for a given angular rotation of the disc 409 to a counter 411 and a comparator circuit 412.

A tool 421 rotated by a spindle device 422 is fed along the Y axis by a drive screw 423 and drive nut 424 driven by electric motor 425. The screw 423 rotates electrostatic measuring screw 426 through known adjustable differential 427 and an electrostatic measuring nut 428 is moved by the carriage 422 along the screw 426. A bridge circuit and transducer 429 is adapted to pick up longitudinal decentering of the nut 428 and screw 426 and adjust the gearing 427 to correct the decentering. Disc 430 having equally spaced magnetic pulses on the periphery thereof sends each pulse to a known comparator 431 through flux reading head 432 for a given angular rotation of the screw 426.

A binary coded tape 440 prepared in a ray tracing computer provides three separate pieces of information to a known tape reader 441 for direct control of the machine of FIG. 11. X information from the tape is fed by the reader to a known shift register 442 to actuate the X carriage power motor 403 to provide a given rate of transverse or X motion. X information is also fed in digital form to the known comparator 412 which is fed by the encoder disc 409 on the shaft of the X axis measuring screw 406. The mixing is accomplished in the X comparator 412 in such a manner that periodically the Y comparator 431 is triggered to command the Y carriage motor 425 to correct itself, and to proceed toward the next check point at a rate which will give a predetermined slope, $dY/dX$, for the surface contour.

Y information from the binary coded tape 440, repesenting the desired travel of Y carriage 422 (perpendicular to the work surface), fed through known register 445 and is compared with the actual travel of the Y carriage as measured by the Y shaft encoder disc 430. This difference appears at the output of the Y comparator 431 and is an actual count of increments of error at a given check point. This error count is combined with $dY/dX$ information from the tape 440 and fed into a known digital to analog converter 443 along with $dX/dY$ slope count supplied by the tape and reader to known register 444 and by the register 444 to the converter 443. The converter 443 commands the Y carriage 422 to correct the error and proceed with the proper $dY/dX$ slope. This command is repeated each time the X comparator 412 triggers the Y comparator 431.

The counter 411 after receiving a predetermined number of pulses actuates known forward reverse switch 451 to reverse the direction of drive of the known motor device 425 when the slope on the face of the lens blank is to be reversed. In the machine of FIG. 11, both the work carriage and the tool carriage are fed precisely and held within one micro-inch, the control of the drives 403 and 425 being effected directly by the translator system above described.

Certain features of the above described machines are disclosed and claimed in co-pending application Serial No. 48,024, filed on the same day as this application by Gerhard Lessman and assigned to the common assignee, and co-pending applications Serial No. 47,993 and Serial No. 48,148, filed on the same day as this application by DuWayne Stevens and assigned to the common assignee.

While the invention is thus described, it is not wished to be limited to the precise details described, as changes may be readily made without departing from the spirit of the invention.

What is claimed is:

1. In a machine of the class described, a first carriage, a feed nut fixed to the carriage, a feed screw having a given pitch and rotatable to advance the nut and carriage therealong, a drum keyed to the feed screw and having a helical magnetic track thereon having the same pitch as that of the feed screw, a magnetic reproducing head carried by the carriage along the magnetic track, a second carriage movable relative to said first carriage and means controlled by the signals picked up from the track by the head to control the movement of said second carriage relative to said first carriage.

2. In a machine of the class described, a feed screw having a predetermined pitch, means for rotating the feed screw, a first carriage movable by the feed screw, a drum keyed to the feed screw and having a helical record track having a pitch the same as that of the screw and a pattern of command pulses recorded thereon, a reproducing head carried by said first carriage along the record track for picking up command pulses recorded on the track, a second carriage movable relative to said first carriage and means controlled by the signals picked up by the reproducing head to control the movement of said second carriage relative to said first carriage whereby a workpiece on one of said carriages will be operated upon by a tool on the other of said carriages.

3. The machine of claim 2 wherein the means controlled by the signals includes drive means for advancing the second carriage a predetermined distance in response to each pulse picked up by the reproducing head.

4. The machine of claim 3 and including a second record track driven by the drive means and having response pulses recorded thereon at points corresponding to said predetermined distance, second reproducing means for picking up the response pulses, and means responsive to the response pulses picked up by the second reproducing means for stopping the feed screw rotating means and the drive means upon the occurrence of a predetermined discrepancy between the number of command pulses picked up and the number of response pulses picked up.

5. In a machine of the class described, a member, rotating means for moving the member, a disc mounted for movement with said rotating means having a sine wave recorded on the periphery thereof, a pair of playback heads spaced relative to the disc and one another so as to pick up portions of the sine wave spaced ninety degrees in phase apart, pulse-forming means responsive to the playback heads for forming a pulse at each of said ninety degree portions of said sine wave, and means responsive to the pulse-forming means for indicating the position of the member.

6. In a machine of the class described, means for producing a series of command pulses spaced from one another in a predetermined pattern, a drive, means responsive to operation of the drive for producing a response pulse for each predetermined increment of movement of the drive, counter means responsive to each command pulse for actuating the drive to move said increment, means responsive to each response pulse to actuate the counter means to respond to the next command pulse, and means responsive to a predetermined discrepancy between the number of command pulses produced and the number of response pulses produced for stopping the drive.

7. In a machine of the class described, a work feed screw, a work carriage driven by the work feed screw, helical record track means having command pulses recorded therealong in a predetermined pattern and rotated by the work feed screw, a tool feed screw, a tool carriage driven by the tool feed screw, a cylindrical record track keyed to the tool feed screw and having response pulses recorded thereon at equally spaced positions therearound corresponding to a given angular increment of movement of the tool feed screw, a stepping motor for turning the tool feed screw through said angular increment when actuated, a playback head carried by the work carriage along the helical record track for picking up the command pulses thereon, a second playback head for picking up the response pulses on the cylindrical record, and bi-directional counter means receiving the command and response pulses from the playback heads and operable by the command pulses to actuate the stepping motor and by the response pulses to permit operation of the counter means by the command pulses.

8. The machine of claim 7 wherein there is provided anti-coincidence means between the playback heads and the counter means operable by simultaneous receipt of both a command pulse and a response pulse to transmit one of these pulses to the counter means and delay the other pulse and then transmit said other pulse to the counter means.

9. The machine of claim 8 wherein the anti-coincidence means includes a first "And" gate positioned in the path of the command pulses to the counter means and actuatable to a gating condition by each command pulse, a second "And" gate positioned in the path of the response pulses to the counter means and actuable to a gating condition by each response pulse, and a free running multivibrator supplying pulses alternately to the gates.

10. The machine of claim 7 wherein the stepping motor is reversible, reversible switching means operable to reverse the direction of the stepping motor after receiving a predetermined number of command pulses.

11. In a machine of the class described, a bi-directional counter means, means for supplying command pulses to the counter means to actuate the counter means in the add direction, drive means, record track means having a sine wave signal recorded thereon, a first playback head positioned to pick up the sine wave signal, second playback head positioned relative to the first head and the record track means to pick up the sine wave signal ninety degrees out of phase from the pickup by first playback head, a first squaring circuit responsive to the signal on the first head for producing separate output signals one hundred eighty degrees out of phase, a second squaring circuit responsive to the signal on the second head for producing separate output signals one hundred eighty degrees out of phase from one another and lagging the signals from the first squaring circuit by ninety degrees, a gating network operable by the first and second squaring circuits to supply an output pulse whenever one of the output signals from the squaring circuits changes in a positive going direction for movement of the record track in one direction, a second gating network operable by the first and second squaring circuits to supply an output pulse whenever one of the outputs of the squaring circuits changes in a positive going direction for movement of the record track in the opposite direction, reversible switching means normally operative to connect the first gating network to the counter means so as to cause the output pulses therefrom to subtract from the counter means and to connect the second gating network to the counter means to cause the output pulses therefrom to add to the counter means and reversible to reverse these connections to the counter means, and means responsive to the counter when in an add condition to actuate the drive means.

12. The machine of claim 11 wherein the reversible switching means serves when actuated to reverse the direction of the drive means.

13. In a machine of the class described, a response record track having a sine wave signal thereon, playback head means for pickup of the signal, means operative to normally drive the track in one direction but permitting movement thereof in the opposite direction, a bi-directional counter, and gating means operable to supply subtract pulses to the counter when the sine wave signal changes in a positive going direction and to supply add pulses to the counter when the signal changes in a negative direction.

14. In a carriage feed, a carriage, means for advancing the carriage within predetermined limits of error, electrical sensing means for determining the error of position of the carriage, electrically actuated transducer means for changing the position of the carriage relative to the advancing means so as to compensate for error in the feed of the carriage by the advancing means, pulsing means operable by the sensing means to supply electrical power to the transducer means, and a resistance-capacitance network for damping and prolonging the pulses to the transducer means.

15. The carriage feed of claim 14 in which the transducer means includes a magnetostrictive core and an electromagnetic coil surrounding the core and coupled to the resistance-capacitance network and the pulsing means.

16. The carriage feed of claim 15 in which the sensing means includes an electrostatic nut movable with the carriage and an electrostatic screw having a thread interleaving the thread of the nut.

References Cited in the file of this patent

UNITED STATES PATENTS

| | | |
|---|---|---|
| 2,611,964 | Buisson | Sept. 30, 1952 |
| 2,628,539 | De Neergaard | Feb. 17, 1953 |
| 2,843,975 | Kamm | July 22, 1958 |